No. 735,512. Patented August 4, 1903.

UNITED STATES PATENT OFFICE.

HENRY HIRSCHING, OF SAN FRANCISCO, CALIFORNIA.

TREATMENT OF ORES CONTAINING GOLD, SILVER, COPPER, NICKEL, AND ZINC.

SPECIFICATION forming part of Letters Patent No. 735,512, dated August 4, 1903.

Application filed March 19, 1902. Serial No. 98,964. (No specimens.)

*To all whom it may concern:*

Be it known that I, HENRY HIRSCHING, a citizen of the United States, residing in San Francisco, in the county of San Francisco and State of California, have invented a certain new and useful Improvement in the Treatment of Ores Containing Gold, Silver, Copper, Nickel, and Zinc, of which the following is a full, clear, and exact description.

My invention relates to a process whereby the metals of complex and refractory ores and tailings can be extracted, and more especially gold, silver, copper, nickel, and zinc can be produced separately and economically. The process is a continuous hydrometallurgical process, using as a solvent water, ammonia, and compounds thereof, and is carried on in a simple apparatus, for which a separate application, Serial No. 85,320, has been filed. The process is applicable directly to raw comminuted ores and tailings containing the said metals if they are soluble in my solvent, or if they are refractory or not soluble a preliminary treatment is required, consisting in roasting, with or without salt, and moistening with acidulated salt water or salt solutions, as explained below. The preliminary treatment is to convert the metals and metal compounds in the ores or tailings into metal salts soluble in water, ammonia, and compounds thereof, such as carbonate, sulfate, nitrate, and chlorid of ammonia. Roasting in many cases will not accomplishing this, because by the application of heat one metal becomes a soluble salt and another under like conditions becomes indifferent or insoluble. For this reason no uniform and profitable extractions could be obtained by means of the processes and apparatus hitherto employed. It is my aim to provide a complete and perfect process, giving uniform results with all kinds of ores or tailings and high extractions of the above-named metals.

My invention will be fully described hereinafter and the novel features pointed out in the appended claims.

It has been found by actual working tests on a large scale that by roasting, with or without salt, of the refractory sulfid ores containing gold, silver, copper, nickel, and zinc no uniform conversion is obtained of the metals or metal compounds into metal salts soluble in water or ammonia and compound thereof. The reason of this is the complexity of the ore and the impossibility to adapt the roasting temperature equally to all metals and metal compounds in the ore. In order to remedy such defective roasted ore, I moisten it on the cooling-floor with salt solutions, such as ferric sulfate, ferric chlorid, or with a very dilute acid solution containing some salt. Such solutions I will call "acidulated solution." Time must be given for the reaction to take place before subjecting the ore to the leaching process. By this reaction the reduced metals, and in the case of copper the formed cupric and cuprous oxids, as they come from the roasting-furnace are converted into salts soluble in my solvents. The conversion of the cupric and cuprous oxids into soluble hydrated cupric oxid takes place by the action of the acid radical, which transforms one molecule into sulfate or chlorid, then under electrochemical action due to the presence of moisture dissociates itself therefrom, leaving soluble hydrated cupric oxid, and then acting in the same manner on the next molecule. The chemical formulæ for this reaction if, for instance, $H_2SO_4$ is used are as follows:

1. $CuO + H_2SO_4 = Cu(HO)_2 + SO_3$.
2. $SO_3 + H_2O = H_2SO_4$.

This illustrates that $H_2SO_4$ is only the agency of the conversion, and therefore a very small quantity only of the acid is required. Of course reasonable time is necessary for a complete conversion of all the copper oxids in the ore-body into soluble salts. It further illustrates the cheapness of the process and its chemical distinction from the acid-dissolution processes.

The use of acidulated solution is recommended above for ores in which the roasting process did not accomplish a complete conversion into soluble salts. The cheapness of the moistening process will recommend itself for general application for all classes of ores and tailings, raw or roasted, with or without salt, in which there are compounds that without this moistening process would remain insoluble. With this moistening process properly applied a uniform extraction of the metals present in the ore can be obtained by my solvent to an extent of ninety to ninety-five per cent., a result superior to anything heretofore accomplished in any ammonia solvent, the reason for the previous unsatisfactory results being the complexity of the ore-bodies as found in nature and the consequent difficulty of transforming the metals uniformly into soluble salts by the methods heretofore in use. My process is therefore a combination process, comprising a preliminary treatment, followed by lixiviation, and is applicable and effective with ores or tailings containing one, any or all of the metals—gold, silver, copper, nickel, and zinc. The extraction of the metals and their conversion into commercial products will be explained farther on.

I will now describe the process with ores or tailings containing gold, silver, copper, nickel, and zinc. When a chlorinating roast is carried out, there are formed among other compounds chlorids of the precious and base metals. If then a small quantity of water is added to the ore-body in a leaching vessel, some of the chlorid salts are dissolved, and in this solution the chlorids of gold and silver are readily soluble. This operation facilitates the subsequent leaching process with ammonia, because a part of the soluble metal salts is removed from the ore-body. Besides this, the washing with water prior to the introduction of the ammonia solvent reduces the vehement reaction which takes place when ore, raw or roasted, with or without salt, moistened or not, is gradually fed into a closed leaching vessel containing the ammonia solvent. Such vehement reaction will create heat and the ammonia is driven out, thus producing a great pressure. As a result of all this, the liquid becomes free of the volatile ammonia, and therefore further dissolution ceases, and on the other hand cupric or metal oxids are precipitated in the ore-body according to the following equation, viz:

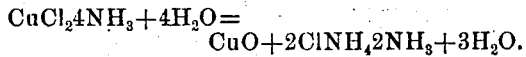

These different phenomena combined result in a low extraction and the precipitation of the metal oxids in the ore-body entails loss. Now I overcome all these chemical and physical difficulties by charging first the ore, giving a wash with water, and then I introduce the ammonia-stock solution into the leaching vessel. The ammonia hereby combines with the metals, forming ammoniated cupric or metal compounds. There being a very small quantity of volatile ammonia present only little ammonia can be driven out by the heat produced by the reaction and no serious pressure will occur, and such heat as is produced is taken up by the incoming stock solution, only slightly raising its temperature. For these several reasons my new method of adding the solvent to the ore-body is far superior to the old method of adding the ore to the solvent. This shows that laboratory reactions and laboratory processes are in many cases not reliable for hydrometallurgical purposes, as the chemical reactions on a large scale with large quantities of material bring about conditions that may escape notice if small quantities are dealt with. All these facts and conditions are of very great importance, as on them depend financial success or failure. The extraction of the metal by this new process may be illustrated by the following equation, having reference to copper, viz:

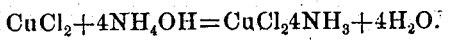

The solution obtained by the water-wash of the ore in the leaching vessel contains the precious metals and is passed into what I call the "gold-tank." This water-washing is carried on with a small quantity of water, and then I leach with ammonia-stock solution and with the liquids coming from the wash-water and boiled-out storage-tanks, about which liquids I will give a full explanation later on. Hereby the balance of the soluble metal salts and of chlorid of silver is dissolved. The formed ammoniated copper or metal solution may now be passed into the gold-tank and then into a settler or directly into a settler. In the latter case ammonia-stock solution is passed into said gold-tank and from there into a settler. In either case gold and iron dissolved in the chlorid solution are precipitated. The metal salts, however, with the chlorid of silver, are dissolved as ammoniated copper or metal compounds. They pass through a filter into a settler and unite with the previously-obtained ammoniated copper or metal solution from the leaching vessel. Of course if separate treatment is desired the two extractions are passed into two separate settlers. After washing the precipitates in the gold-tank they may be melted and will give metallic gold. The gold precipitated with ammonia forms an explosive, and the reducing or melting can only safely be done if converted into another salt. Also silver will hereby be precipitated if cuprous chlorid or sulfate is in the solution, and then I prefer to dissolve the precipitated gold and silver compounds after washing in a solution of cyanid of potassium or $Na_2S_2O_3$ solution, as they are readily soluble in such solutions, and recover them in the usual way. Instead of precipitating the gold in the gold-tank, as aforesaid, the gold and silver can be recovered by galvanic action or any other approved method. As regards the chlorid of silver, and also if some gold is yet retained in solution by the ammonia, it is recovered as cement, silver, and gold in the settler by galvanic action. It is desirable that a thorough chlorination or chloridizing should have taken place; otherwise the greater part of the gold remains in the ore-body, but fortunately in such a condition that it can easily be recovered by a cyanid solution after the ore has been treated with ammonia. I usually keep the strength of the ammoniated metal solution for boiling-out purposes at two to four pounds of metal per cubic foot. The ore-body after leaching with the ammonia-stock solution and the said liquids is drained and washed, giving as first product an extraction of gradually-diminishing strength. This I pass into the solution-settler. I continue the washing and draining, finally with water, until all metal is removed, which is indicated by absence of color in the wash-water, and I pass this second product of washing into a wash-water settler, from where, after settling, I pass the wash-water into the wash-water storage-tank. From this tank I draw when making the first product of extraction of the next charge in the leaching vessel. After settling the solution in the settler, if clear, is passed directly into the still. If turbid, it first passes through a quartz-filter. We have now in the still and ready for precipitation a solution of copper, nickel, and zinc. I pass into the still some alkali, preferably caustic soda, and adjust the quantity to the quantity of the three metals in the still. Supposing the extraction of one ton of ore gave a solution of one hundred pounds of copper, fifty pounds of nickel, and one hundred pounds of zinc, then I charge three hundred pounds of caustic soda from the alkali-tank; if only copper and zinc are present, two hundred and fifty pounds; if only copper and nickel are present, two hundred pounds, and if only copper is present only a few pounds of caustic soda, to break up the formed basic cupric-ammonium compounds. Referring first to the last case, I precipitate as a rule the cupric oxid by boiling the solution with steam. This precipitation is retarded, particularly at the last stage of the process, by the presence of basic cupric-ammonium compounds in the solution. This compound is more especially formed in large quantities if hot air be employed in the boiling-out process. I overcome the difficulty to a certain extent by passing into the still condensed ammonia vapors coming from the condensing system, as will be seen in the drawing of the application for the apparatus filed by me; but if large quantities of these objectionable compounds are present I obtain an immediate result by forcing a few pounds of alkali solution from the alkali-tank at the last stage of the boiling-out process into the still, as above stated. The separation of the cupric oxid from the ammonia is very rapid and complete. The reaction, if chlorids are treated, is as follows, viz:

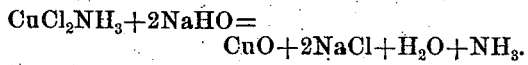
$$CuCl_2NH_3 + 2NaHO = CuO + 2NaCl + H_2O + NH_3.$$

This improved process is used if the ore is treated only for copper, as I have stated before. The boiled-out solution is, after cooling, used over and over again for extraction purposes, as aforesaid, until saturated with salts. Then it is charged into a lime-still, where the non-volatile ammonia compounds are separated in the usual manner, forming lime-salts and free ammonia, which latter is recovered in a condensing system, as described in the applications for the apparatus. From the foregoing it follows that only such water as is discharged together with the tailings from the leaching vessel is actually wasted. All the other water may be kept in rotation in the mill, so that even in arid regions this process will be feasible. Returning now to the solution in the still containing copper, nickel, and zinc, I boil the same with steam. The copper precipitates as cupric oxid and the nickel as hydrated nickel monoxid; but the zinc, if small quantities are present, is obtained in solution as soda zincate. If large quantities are present, I prefer to discharge the boiled-out solution into a pan and add a caustic-soda solution to the precipitates of the oxids and boil into steam, whereby all of the zinc is dissolved as soda zincate and a complete separation takes place if agitated by steam. The clear solution I discharge in the same pan, as aforesaid, and also the wash-water, which dilutes the zinc solution, and hydrated zinc oxid (zinc white, if dry) is precipitated, which is shoveled out, dried, and sold, or it is reduced to metallic zinc in a furnace. By boiling the metal solution in the still all of the ammonia is liberated very rapidly and recovered in the condensing system and collected in the ammonia-stock-solution tank as high-grade aquaammonia. I may use for the absorption of the ammonia vapors boiled-out solution or water. The ammonia thus recovered is used by the next batch of ore for dissolving purpose of metal salts in the leaching vessel, and is thus kept in rotation. Four to five pounds of ammonia and not more are lost per ton of ore treated, a fact ascertained by practical tests on a large scale. After the copper and nickel oxids have settled in the still and the soda zincate and wash-water are discharged into the pan I change to the copper and nickel oxids in the still boiled-out solution or water-containing ammonium compounds, such as $NH_4Cl(NH_4)_2SO_4$. I have discovered that cupric oxid is insoluble in warm ammonium compounds, whereas hydrated nickel oxid is readily soluble. I therefore charge into the still ammonium compounds solutions and heat slightly, agitating at the same time with steam, whereby a most perfect and complete separation of the two oxids takes place, the nickel oxid entering into solution and the cupric oxid remaining *in statu quo*. This is the cheapest and most practical method of separating these two metals. If any ammonia is driven out during this process, it is of course recovered in the condensing system. After settling I discharge the ammoniated nickel solution into the next still, wash in the first still with water, and pass this wash-water also into the next still and boil with steam, thereby driving out all of the ammonia, which is recovered in the condensing system. The process of precipitating is rendered complete by adding some caustic soda.

After the separated copper and nickel oxids are settled in their respective stills the supernatant liquor is discharged to a cement-reservoir for cooling purposes and is then passed to the storage-tank to be used over and over again in the leaching vessel for leaching new batches of ore or for manufacturing aqua-ammonia in the ammonia-stock-solution tank. After rotating this boiled-out solution for some time it becomes saturated with salts. I discharge it then into the lime-still and recover all the ammonia by boiling it with lime and agitating it by an agitator. This ammonia is also recovered in the condensing system; but a separate system may be employed, especially by plants with a large capacity. The oxids are discharged into troughs, shoveled to drainers, and dried in an oven. The oxids are sold as such or reduced to metals in separate furnaces. The solution in the pan where the zinc-white was precipitated and recovered contains some caustic soda, salts of chlorid, and sulfate of sodium. The two latter crystallize out by evaporating some of the solution, and these salts are shoveled out, drained and dried, and used for charging the raw ore in the roasting-furnace, where it performs a most perfect and complete chlorinating roast. The remaining caustic-soda liquor is used over again in the distillation of a next batch of ammoniated-metal solution coming from the settler and leaching vessel.

This leaching process is very cheap and economic and allows the successful treatment of the most complex and refractory ores and tailings. The only heavy expense is for the purchase of caustic soda, the quotation price of which is one and eight one-hundredths cents per pound, and the average consumption for such ore as described above is not more than two hundred pounds per ton, which would amount to three dollars and sixty cents per ton. Adding cost of mining, fuel, labor, &c., the whole expense per ton of ore is not more than eight dollars, whereby one hundred pounds of copper, one hundred pounds of zinc, and fifty pounds of nickel are produced with a total value of forty-four dollars, besides recovering the precious metals of the ore as by-products and at a nominal cost.

The plant to be used for carrying out this process is cheap and simple.

This process is the best substitute for any known process of treating all classes of ores.

The condensing system allows the manufacture of aqua-ammonia of all grades up to 26° Baumé. I prefer to employ an ammonia about 18° Baumé for dissolving purposes. The quantity used for each batch of ore is calculated according to the analysis and the atomic weight of the metals to be treated and the molecular weight of the ammonia.

The chemistry is very simple, as can be seen by the following table, viz: first, roasting and preliminary treatment forming chlorids—$AuCl_3, AgCl, CuCl_2, ZnCl_2, NiCl_2$; second, recovering gold or gold and silver by chemical and galvanic action; third, dissolving with $NH_3$, forming $CuCl_2ZnCl_2NiCl_2(NH_3)x$; fourth, precipitating $CuO$ and $Ni(HO)_2$ with caustic soda and heat, recovering $(NH_3)x$ and also $ZnO$;

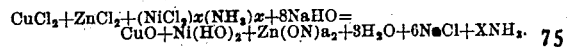

If sulfates are formed, the $Cl_2$ is simply substituted by $SO_4$. If Ag and Au are present and desired to be recovered, a chlorinating roast is necessary. It is obvious that if only one, two, or more of said metals are present in the ore the process remains the same, only the operation is simplified, confining it to the particular metal or metals.

In the settlers slimes accumulate, and after some time (one month or so) I discharge the slimes into the slime-washer, wherein I wash with cold water first and then with warm water, agitating the mass with steam, the escaping ammonia being hereby removed and recovered in the condensing system. The wash-water as long as any color is noticeable is passed into the wash-water-storage tank to be used over and over again in the process in the same manner as the wash-water from the wash-water settler. The slimes if they do not contain any precious metals are discharged to the yard; but if they contain precious metals they may be now recovered by any approved process.

It is known that gold and silver ores if they contain some base metals cannot be treated successfully with mercury or a cyanid-of-potassium solution. I have found that the difficulty can be overcome by first removing the base metals by ammonia with or without previous moistening and then either washing the products of extraction or recovering them in the manner described above. After this treatment the gold and silver can be successfully extracted with mercury or cyanid-of-potassium solution.

It is obvious that ores or tailings containing a high percentage of soluble metal salts in hot boiled-out solution or hot water produced in the condensing system can be successfully extracted in tanks open on top with such hot water, and the obtained metal solution can now be charged directly into the still with ammonia and compounds thereof or with ammonia and an alkali. If then boiled, metal acids will be precipitated, containing some slimes and ferric acid. After discharging and drying briquets can be formed, which can be reduced in a furnace to metallic copper or metals. The escaping ammonia from the still of course is recovered in the same manner as previously described.

It is obvious that raw ores and tailings containing soluble metal salts in my solvents yield to the same treatment as the roasted ores, and therefore come properly within the subject-matter of my invention.

Having described my invention, I claim as new and desire to secure by Letters Patent—

1. The process of treating roasted ores and tailings, which consists in washing with water, leaching with ammonia, or ammonium sulfate, chlorid or nitrate, adding water or wash-water, or boiled-out solution obtained by the operation of the process, and recovering therefrom the metal or metals separately and the ammonia, substantially as described.

2. The process of treating chlorinated ores and tailings, which consists in washing with water, leaching with ammonia, or ammonium sulfate, chlorid or nitrate, adding water or wash-water, or boiled-out solution obtained by the operation of the process, and recovering therefrom the metal or metals separately and the ammonia, substantially as described.

3. The process of treating roasted ores and tailings, which consists in mixing the same with an acidulated solution, washing with water, leaching with ammonia, or ammonium sulfate, chlorid or nitrate, adding water or wash-water, or boiled-out solution obtained by the operation of the process, and recovering therefrom the metal or metals separately and the ammonia, substantially as described.

4. The process of treating chlorinated ores and tailings, which consists in mixing the same with an acidulated solution, washing with water, leaching with ammonia or ammonium sulfate, chlorid or nitrate, adding water or wash-water, or boiled-out solution obtained by the operation of the process, and recovering therefrom the metal or metals separately and the ammonia, substantially as described.

5. The process of treating ores or tailings, containing gold, silver, copper, nickel and zinc, which consists in washing with water, leaching with ammonia and compounds thereof, and then recovering the precious metals by any approved method, substantially as described.

6. The process of treating ores or tailings, containing gold, silver, copper, nickel and zinc, which consists in moistening with acidulated solution, washing with water, leaching with ammonia and compounds thereof and then recovering the precious metals by any approved method, substantially as described.

7. The process of treating chloridized ores and chloridized tailings, containing gold, silver, copper, nickel and zinc, which consists in washing with water, leaching with ammonia or ammonium sulfate, chlorid or nitrate, adding water or wash-water, or boiled-out solution obtained by the operation of the process, precipitating the gold from the wash solution by adding ammonia, recovering it as metallic gold, and recovering the other metals and ammonia separately, substantially as described.

8. The process of treating ores and tailings, containing gold, silver, copper, nickel and zinc, which consists in washing with water, leaching with ammonia, or ammonium sulfate, chlorid or nitrate, adding water or wash-water, or boiled-out solution obtained by the operation of the process, precipitating the gold from the wash solution by adding ammonia, recovering it as metallic gold and precipitating from the formed ammonia metal solution the silver by galvanic action, and recovering the other metals and ammonia separately, substantially as described.

9. The process of treating ores and tailings containing gold, silver, copper, nickel and zinc, which consists in washing with water, leaching with ammonia and compounds thereof, adding water or wash-water from a previous washing or boiled-out solution, precipitating the gold from the wash solution by adding ammonia, precipitating from the ammonia-metal solution the silver by galvanic action, precipitating the base metals by boiling and the addition of caustic soda or alkalies, discharging the boiled-out solution and adding caustic-soda solution to the alkalies, thereby dissolving the zinc as soda zincite, discharging the solution into a receptacle and diluting said solution, whereby hydrated zinc oxid $Zn(OH)_2$ is precipitated, evaporating some of the solution so as to recover sodium chlorid, sulfate crystals and caustic liquor, and recovering separately the two remaining metals and the ammonia, substantially as described.

10. The process of treating ores and tailings containing gold, silver, copper, nickel and zinc, which consists in washing with water, leaching with ammonia, or ammonium sulfate, chlorid or nitrate, adding water, or wash-water from a previous washing or boiled-out solution, precipitating gold and silver from the solution by means of galvanic action, precipitating the base metals as oxids by adding caustic soda or its equivalent and boiling the solution, discharging the boiled-out solution, adding caustic soda to the precipitated oxids, thereby dissolving zinc as sodium zincite, removing this solution of sodium zincite and diluting the same, thereby precipitating zinc hydrate, adding a solution of ammonium compounds capable of dissolving nickel oxid, to the oxids from which the sodium zincite was removed, thereby dissolving the nickel oxid, and leaving the copper oxid undissolved, withdrawing the dissolved nickel, adding caustic soda thereto, and boiling, thereby precipitating nickel hydrate and liberating ammonium, which is recovered, substantially as described.

11. The process of treating acid ores and tailings, containing gold, silver, copper, nickel and zinc, which consists in washing with water, leaching with ammonia, or with ammonium sulfate, chlorid or nitrate, adding water or wash-water from a previous washing or boiled-out solution, precipitating the copper as cupric oxid by boiling, and at the last stage of the boiling-out process adding some caustic soda, thus breaking up the formed basic-copper ammonium compounds, and recovering all of the copper separately from the ammonia, substantially as described.

12. The process of treating acid ores or tailings, containing gold, silver, copper, nickel and zinc, which consists in washing with water, leaching with ammonia, or with ammonium sulfate, chlorid or nitrate, adding water or wash-water from a previous washing or boiled-out solution, precipitating the copper as cupric oxid by boiling and passing condensed ammonia vapors into the metal solution to break up the formed basic-copper ammonium compounds, and recovering all of the copper separately from the ammonia, substantially as described.

13. The process of treating ores or tailings, which consists in washing with water, leaching with ammonia, or with ammonium sulfate, chlorid or nitrate, adding water or wash-water, or boiled-out solution obtained by the operation of the process and charging the solvents to the ore, whereby no precipitation in the ore-body by the heat and pressure results, thus assuring a high extraction.

14. The process of treating ores or tailings, which consists in washing with water, leaching with ammonia, or with ammonium sulfate, chlorid or nitrate, adding water or wash-water, or boiled-out solution obtained by the operation of the process, washing first with water and charging then the solvent of ammonia and compounds thereof to the ore, whereby no precipitation in the ore-body by heat and pressure results, thus assuring a high extraction.

15. The process of treating ores or tailings, which consists in washing with water, leaching with ammonia, or with ammonium sulfate, chlorid or nitrate, adding water or wash-water from a previous washing or boiled-out solution, separating the metals and thus producing a boiled-out solution, using said boiled-out solution for the manufacture of aqua-ammonia, and using said aqua-ammonia for leaching, substantially as described.

16. The process of treating acid ores or tailings, containing gold, silver, copper, nickel and zinc, having reference to sulfate ores, which consists of dissolving the metals in hot boiled-out solution or hot water, charging to the solution ammonia, and passing during the boiling-out process condensed ammonia vapors into the metal solution to break up the formed basic-metal ammonium compounds, thus recovering all the metal oxids and all the ammonia combined with them, substantially as described.

17. The process of treating acid ores and tailings, containing gold, silver, copper, nickel and zinc, having reference to sulfate ores, which consists of dissolving the metals in hot boiled-out solution or hot water, charging to the solution ammonia and adding at the last stage of the boiling-out process some caustic soda into the metal solution to break up the copper or basic-metal ammonium compound, then recovering all the copper or metal oxids and all the ammonia combined with them, substantially as described.

18. The process herein described for extracting gold, silver, copper, nickel and zinc from substances containing the same, which consists in subjecting said substances to the action of an acid, washing with water the substance thus treated, thereby forming solutions containing compounds of gold and base metals, and then subjecting said solutions to the action of ammonia for the purpose of precipitating the gold and recovering the base metals from the solution separately and also the ammonia, substantially as described.

In testimony whereof I have signed my name to this specification in the presence of two subscribing witnesses.

HENRY HIRSCHING.

Witnesses:
 FRANK TEICHMANN,
 CHARLES W. HENDEL.